United States Patent [19]

Cole et al.

[11] Patent Number: 4,849,115
[45] Date of Patent: Jul. 18, 1989

[54] PROCESS FOR OXIDIZING ORGANIC RESIDUES IN AN AQUEOUS STREAM

[76] Inventors: Leland G. Cole, P.O. Box 11812, Santa Ana, Calif. 92711; Gordon N. Cole, 420 S. Laurel Ave., Brea, Calif. 92621

[21] Appl. No.: 99,061

[22] Filed: Sep. 21, 1987

[51] Int. Cl.$^4$ ............................................. C02F 1/32
[52] U.S. Cl. ................................. 210/748; 210/763; 210/764; 210/908; 210/192; 422/24
[58] Field of Search ............. 210/748, 764, 101, 192, 210/739, 746, 758–763, 85; 422/24

[56] References Cited

U.S. PATENT DOCUMENTS

| | | | |
|---|---|---|---|
| 3,550,782 | 12/1970 | Veloz | 210/192 |
| 3,924,139 | 12/1975 | Hirose et al. | 422/24 X |
| 3,971,947 | 7/1976 | Lambert et al. | 422/24 X |
| 4,151,085 | 4/1979 | Malik | 210/101 |
| 4,296,066 | 10/1981 | Schenck | 210/264 X |
| 4,372,860 | 2/1983 | Kaas | 210/748 |
| 4,400,270 | 8/1983 | Hillman | 210/748 X |
| 4,438,337 | 3/1984 | Forrat | 210/748 X |
| 4,757,205 | 7/1988 | Latel et al. | 422/24 X |

OTHER PUBLICATIONS

"UV/Ozone Process Treats Toxics", Waterworld News, vol. 3, No. 3, May/Jun. 1987.
Ultrox Systems brochure, Ultrox Int., Santa Ana, Calif. (no date).
"The Destruction of Organic Contaminants in Water by Chemical Oxidation", D. G. Hager and C. E. Smith (Aug. 1986).
Perox-Pure brochure, Peroxidation Systems, Inc., Tucson, Ariz. (no date).

Primary Examiner—Tom Wyse
Attorney, Agent, or Firm—Knobbe, Martens, Olson & Bear

[57] ABSTRACT

An apparatus for oxidizing organic residues in an aqueous stream, comprising a chamber having a top, a bottom, an inlet for introducing a liquid thereinto, and an outlet for removing liquid therefrom, a plurality of dividers in the chamber between the inlet and the outlet dividing the chamber into a plurality of subchambers, a plurality of ultraviolet lamps in the subchambers, means for directing liquid flow through the chamber in a serpentine fashion, a plurality of separate subcovers over the subchambers and the lamps, which subcovers may be individually opened and closed, conductors for supplying electrical current to the lamps, and means for interrupting the flow of current to the lamps under each subcover when the subcover is open while simultaneously permitting such current flow to lamps which are not under an open subcover. Also disclosed is a method for the photolytic oxidation of organic residues in an aqueous stream, comprising the steps of introducing the aqueous stream into a chamber through an inlet, wherein the chamber is divided into a plurality of subchambers, providing at least one ultraviolet lamp in each of the subchambers, directing the liquid stream through the chamber from subchamber to subchamber, introducing an oxidizing agent into the aqueous stream, irradiating the aqueous stream containing the oxidizing agent in the subchambers by means of the lamps, providing at least one separately-openable cover over each subchamber, separately monitoring the operating condition of the lamps in each subchamber, disabling the lamps in one of the subchambers and servicing the lamps while the lamps in other of the subchambers are enabled and the aqueous stream continues to pass through the chamber, and oxidizing substantially all inorganic impurities in the stream in the other subchambers while servicing the disabled lamps.

9 Claims, 6 Drawing Sheets

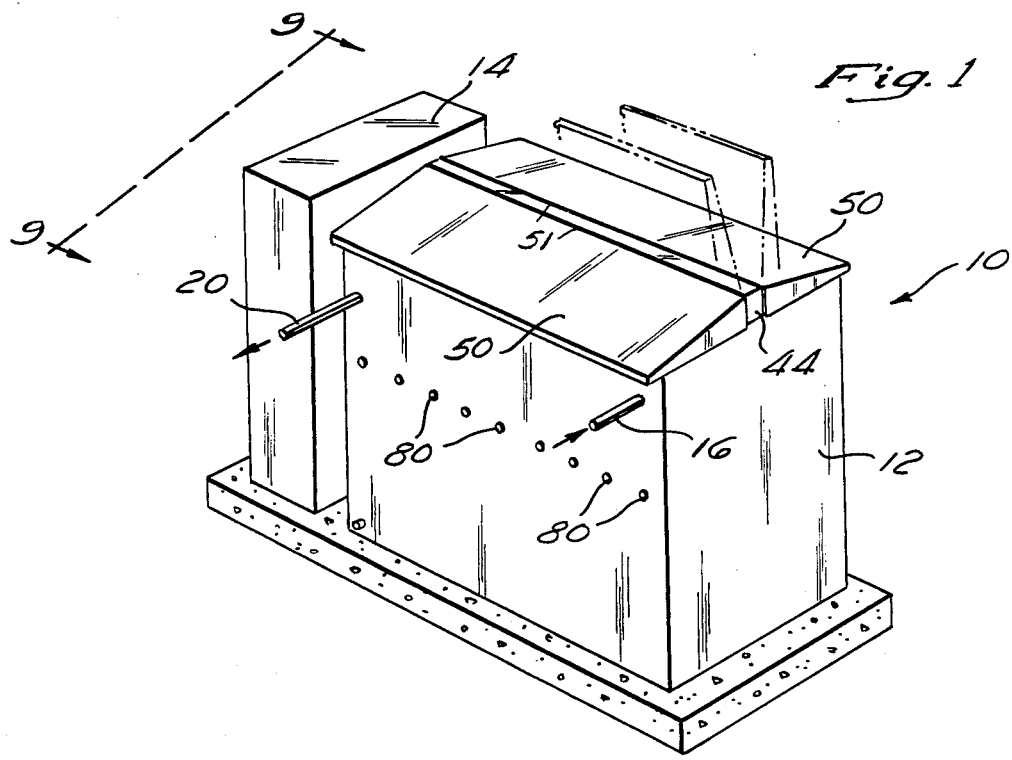
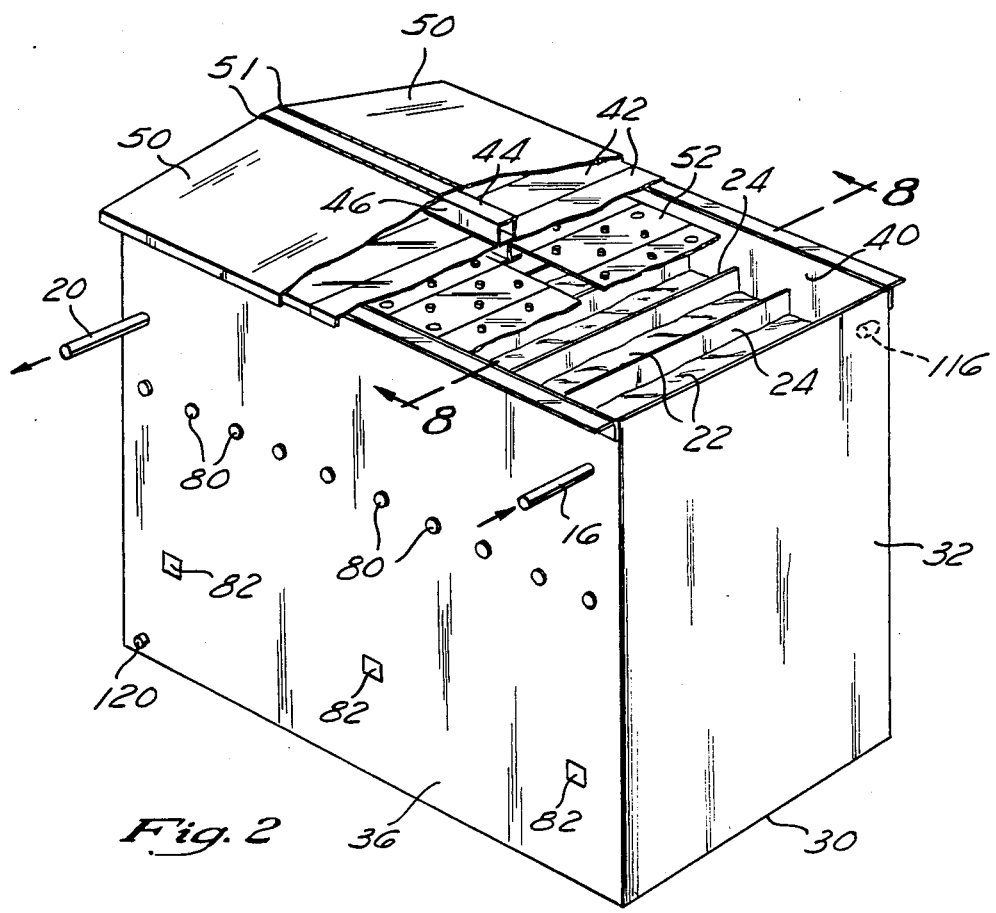

U.S. Patent  Jul. 18, 1989  Sheet 3 of 6  4,849,115
Fig. 5
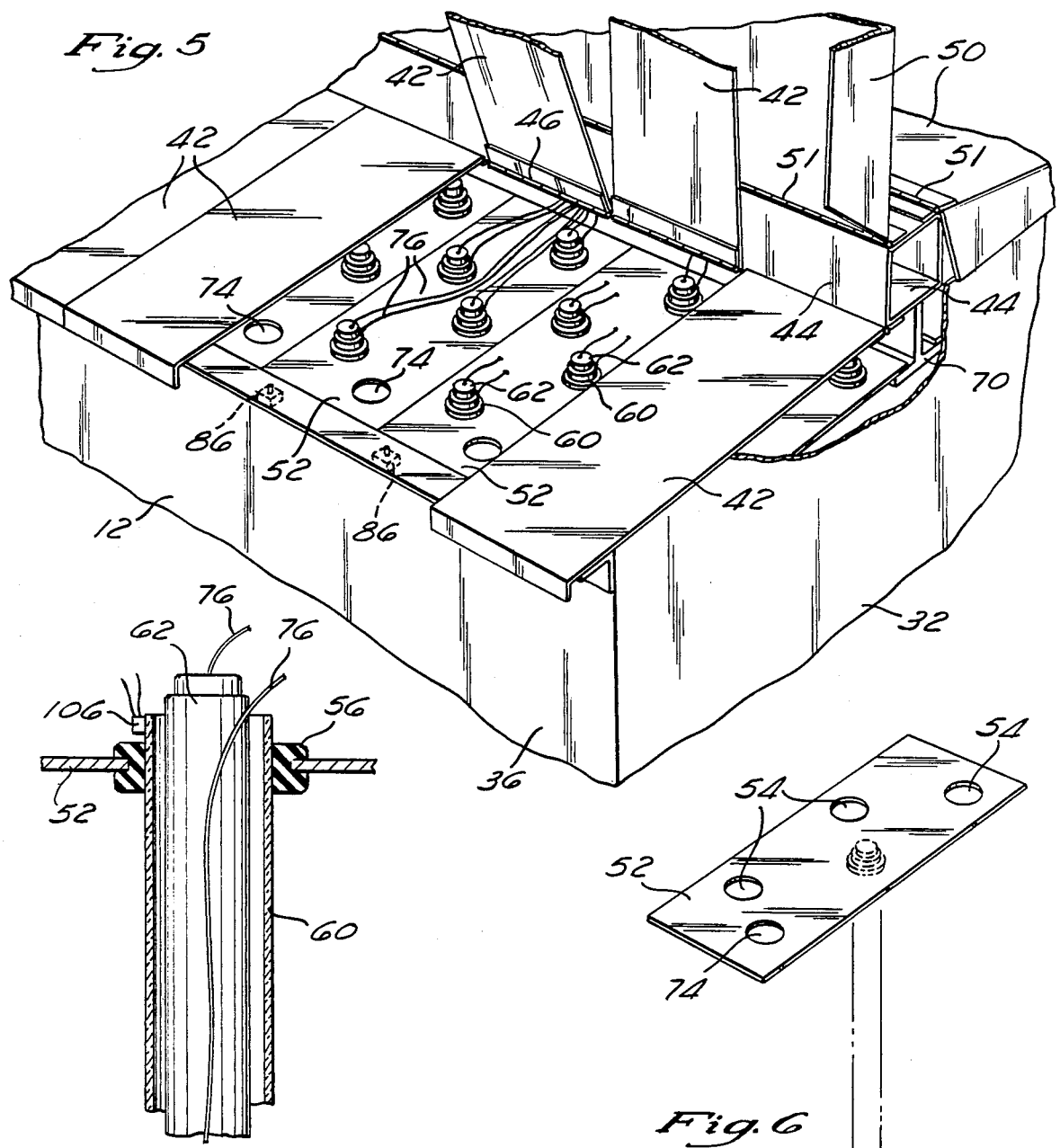
Fig. 7
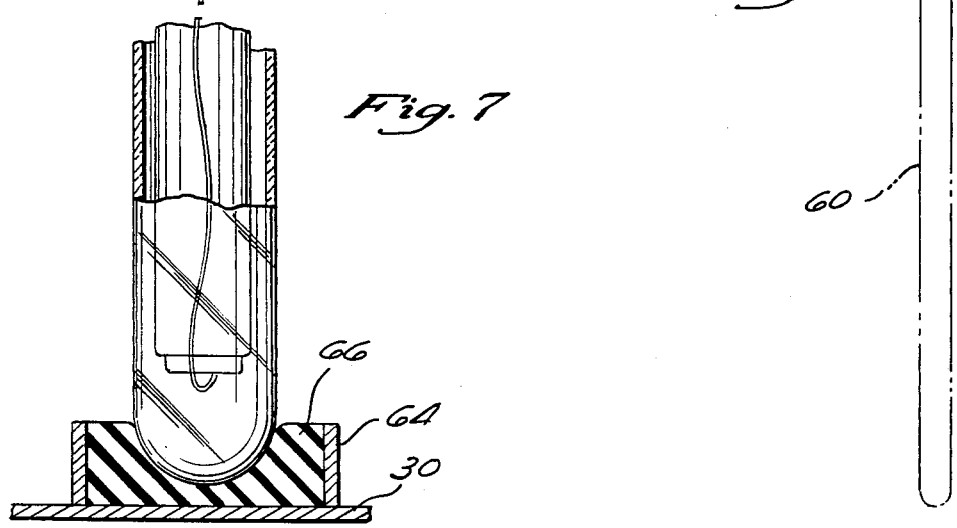
Fig. 6

PROCESS FOR OXIDIZING ORGANIC RESIDUES IN AN AQUEOUS STREAM

BACKGROUND OF THE INVENTION

The present invention relates to an improved apparatus and method for the photolytic oxidation of organic residues in water, and more particularly to the oxidation of those residues by adding an oxidizing agent to the water to be treated, then exposing the water to ultraviolet light.

Systems for treating water by adding an oxidizing agent, such as hydrogen peroxide ($H_2O_2$) or ozone ($O_3$), and then oxidizing organic impurities in the water by exposing the water to ultraviolet light are well known. The ultraviolet light serves to catalyze the oxidation of the organic compounds, converting them to water and carbon dioxide.

Photolytic oxidation of wastewater streams is conventionally carried out in a tank-like reactor containing an ultraviolet light source. A measured amount of an oxidizing agent is added to the incoming stream. As the water proceeds through the reactor, the desired oxidation reaction takes place.

In many situations, interruption of the flow of water through the reactor is to be avoided, if possible, because such interruption can inconvenience or disrupt other operations that generate or supply the water. This is particularly true in applications where treatment of the water in the reactor is simply one stage in a multi-stage process which generates the wastewater. At the same time, it is probably impossible to build a reactor with today's technology that is totally maintenance free; accordingly, conventional reactors require periodic shutdown for maintenance. One of the major maintenance requirements of this type of reactor is replacement of the ultraviolet lamps.

Reactors of the type to which the present invention relates typically utilize low-pressure metal vapor lights. These ultraviolet lights have a limited lifetime, and at some point, simply burn out. The same is true of other conventional ultraviolet light sources, such as incandescent lamps, medium pressure and high pressure metal vapor lamps, and arc lamps. Burned out lamps, of course, require replacement. Safe practice dictates that the power to the lamps be disabled prior to replacement. One reason for this is, of course, the desire to avoid the possibility of electrical shock from handling wires and connectors that are electrically energized. Another reason that is of particular concern when using ultraviolet lamps is the avoidance of the potentially harmful exposure of maintenance workers and others to ultraviolet radiation. Such radiation can result in ocular damage and epidermal burning.

For this reason, the lamps in the reactor are typically extinguished while lamp or other maintenance is in process. Unfortunately, while the lamps are out, no significant oxidation of the organic impurities in the water occurs. In many instances, the water is being treated in order to satisfy governmental regulations, and disposal of water that has not been adequately treated constitutes a violation of those regulations. Thus, while lamp maintenance is in progress, the water flow through the reactor must be interrupted, often with serious disruption of other processes that generate the water in question.

Another concern in systems of this type is accidental exposure of workers to the ultraviolet light. As set forth above, such exposure can damage the health of the worker and should be avoided. Although protective clothing and eyewear can minimize the consequences of exposure to strong ultraviolet light, it is unreasonable to expect that all workers and others in the proximity of the reactor would have such protective gear. Moreover, protective gear is generally uncomfortable or inconvenient and, thus, is not always worn in situations that should require the use of such gear.

Accordingly, one object of the present invention is to provide a method and apparatus for photolytic oxidation of organic residues in water that can operate continuously without requiring shutdown for most routine maintenance.

Another object of the present invention is the provision of a reactor that includes safety features designed to prevent unauthorized access to reaction chambers in which there is a danger of exposure to ultraviolet light and to prevent accidental exposure of maintenance personnel and other workers to potentially harmful ultraviolet radiation.

Other objects, features, and advantages of the present invention will become apparent in light of the following explanation.

SUMMARY OF THE INVENTION

In accordance with one aspect of the present invention, there is provided a device for oxidizing organic residues in an aqueous stream, comprising a chamber having a top, a bottom, an inlet for introducing a liquid thereinto, and an outlet for removing liquid therefrom, a plurality of dividers in the chamber between the inlet and the outlet dividing the chamber into a plurality of subchambers, a plurality of ultraviolet lamps in the subchambers, means for directing liquid flow through the chamber in a serpentine fashion, a plurality of separate subcovers over the subchambers and the lamps (which subcovers may be individually opened and closed), conductors for supplying electrical current to the lamps, and means for interrupting the flow of current to the lamps under each subcover when the subcover is open while simultaneously permitting such current flow to lamps which are not under an open subcover.

In one preferred embodiment, each subcover covers at least a portion of a subchamber, and the interrupting means interrupts the flow of current to lamps in the subchamber or subchambers over which the subcover is located when the subcover is open. The interrupting means is preferably automatically actuated by the opening of the subcover. The lamps preferably extend vertically from the top of the chamber to the bottom thereof, and a plurality of the lamps are preferably located in each subchamber.

In another preferred embodiment, a plurality of ultraviolet-transparent tubes extend from the top of the chamber to the bottom thereof, and the lamps are located in those tubes. The tubes are designed to prevent physical contact between the lamps and the aqueous stream. In addition, the device may have at least one outer cover covering a plurality of the subcovers. The device may advantageously further comprise an alarm for indicating the unauthorized opening of the outer cover.

In yet another preferred embodiment, the device is provided with a plurality of sight glasses in the side of the device, which permit the lamps inside each subchamber to be visible from outside the chamber. The sight glasses preferably function as ultraviolet-blocking filters to facilitate viewing of the lamps with the unprotected eye.

In still another preferred embodiment of the invention, the device includes an enclosed channel running along the top of the chamber and extending across the subchambers. The channel carries the conductors, and supports a plurality of hinges pivotally connecting the subcovers to the channel.

In accordance with another aspect of the present invention, there is provided a method for the photolytic oxidation of organic residues in an aqueous stream, comprising the steps of introducing the aqueous stream into a chamber through an inlet, wherein the chamber is divided into a plurality of subchambers, providing at least one ultraviolet lamp in each of the subchambers, directing the liquid stream through the chamber from subchamber to subchamber, introducing an oxidizing agent into the aqueous stream, irradiating the aqueous stream containing the oxidizing agent in the subchambers by means of the lamps, providing at least one separately-openable cover over each subchamber, separately monitoring the operating condition of the lamps in each subchamber, disabling the lamps in one of the subchambers and servicing the lamps while the lamps in other of the subchambers are enabled and the aqueous stream continues to pass through the chamber, and oxidizing substantially all inorganic impurities in the stream in the other subchambers while servicing the disabled lamps.

In another preferred embodiment of the method, the number of lamps provided in the chamber are in excess of the number required to catalyze the oxidation of the organic impurities in the liquid stream, so that substantially complete oxidation of the impurities occurs even though the lamps in one of the subchambers are disabled. It is preferred that each of the subchambers further includes means for disabling all of the lamps in the subchamber when a subcover over that subchamber is opened. In addition, a preferred embodiment further comprises the steps of providing a cover over a plurality of the subcovers, and providing an alarm actuated by the opening of the cover.

In still another preferred embodiment of the invention, the method further comprises monitoring the operation of each of the lamps, and providing an indication of the operating condition of each of the lamps. Where the lamps are tubular low pressure metal vapor lamps, and power to the lamps is provided through a plurality of ballasts, the monitoring step preferably comprises monitoring the operation of each of the ballasts. In addition, the method further comprises the step of counting the number of lamps which are not functioning and providing a visual display of that number. Moreover, the method may include the step of actuating an alarm (preferably an audible alarm) when the number of lamps which are not functioning exceeds a predetermined number.

BRIEF DESCRIPTION OF THE DRAWINGS

FIG. 1 is a perspective view of the device of the present invention.

FIG. 2 is a perspective view of the reaction chamber of the present invention, partially cut away to reveal the construction of the covers and lamp supports.

FIG. 5 is a partially-cut away perspective view of the top of the reaction chamber, in which one main cover and two subcovers have been opened.

FIG. 6 is a perspective view of a lamp support with one lamp tube shown in phantom.

FIG. 7 is a side elevation, partially in section, of a lamp tube, lamp and lamp supports.

DETAILED DESCRIPTION OF THE INVENTION

Figure 4:
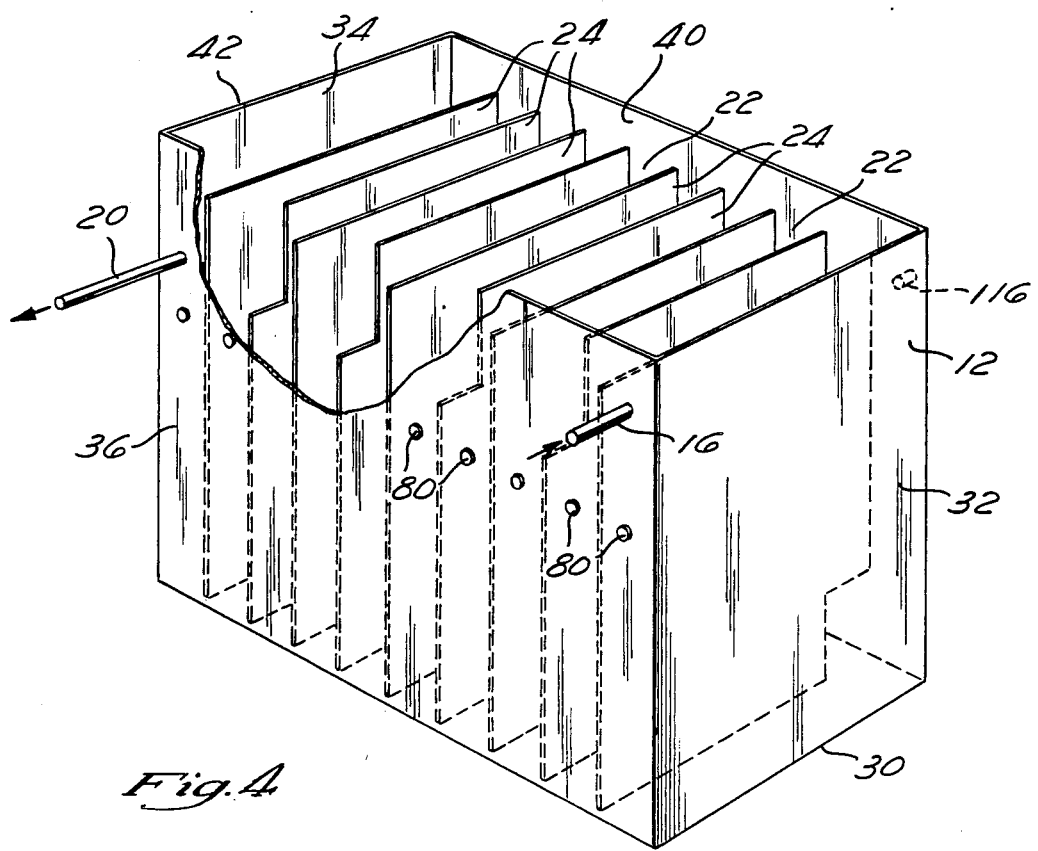
FIG. 4 is a partially-cut away perspective view of the reaction chamber of the present invention from which the covers and lamp assemblies have been removed, illustrating the arrangement of the dividers.

The reactor 10 of the present invention includes a reaction chamber 12 and a control housing 14. The reaction chamber 12, as illustrated in FIGS. 1, 2 and 4, is generally an open-topped box suitable for receiving a liquid. The reaction chamber 12 is preferably rectangular, and the size of the reaction chamber 12 may advantageously be tailored to the particular application for which the reactor 10 is intended, with consideration of such factors as the flow rate and residence time required to accomplish the desired degree of photolytic oxidation of impurities in the water to be treated.

The reaction chamber 12 is provided with an inlet 16 and an outlet 20 for introducing water into the reactor and removing water from the reactor. In one preferred embodiment, the reactor is made of stainless steel.

Figure 3:
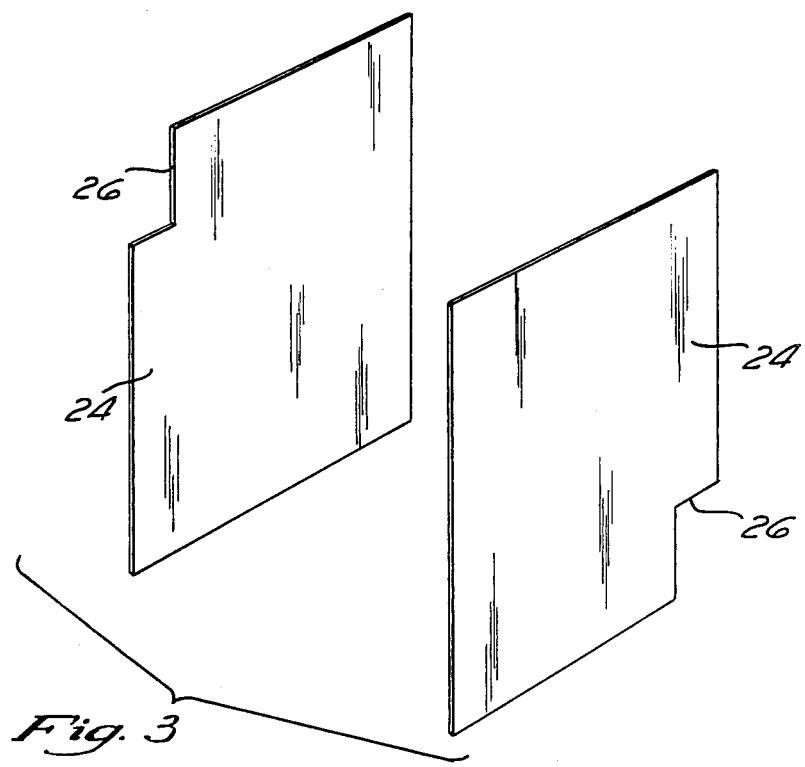
FIG. 3 is a perspective view of two of the dividers used in the reaction chamber.

The interior of the reaction chamber 12 is divided into a plurality of subchambers 22 by a plurality of dividers 24. The dividers 24 are illustrated more fully in FIGS. 3 and 4. FIG. 3 shows a pair of dividers 24, and FIG. 4 illustrates nine dividers 24 dividing the reaction chamber 12 into ten subchambers 22. With reference to FIG. 3, the dividers 24 advantageously comprise planar sheets of rigid material, such as stainless steel, with notches 26 in one corner thereof to provide a fluid flow path past the divider 24.

In a preferred embodiment, the reaction chamber 12 is in the form of a box with a generally rectangular, horizontal bottom 30 and two pairs of parallel, rectangular, vertically-extending walls attached to the bottom 30. One pair of such walls may be designated as a first end 32 and a second end 34, which comprise opposite walls of the reaction chamber 12, and the other pair of such walls may be designated as a first side 36 and a second side 40, which also comprise opposite walls of the reaction chamber 12. The first end 32 is parallel to the second end 34, and the first side 36 is parallel to the second side 40, while the ends 32, 34 are orthogonal to the sides 36, 40.

The dividers 24 extend vertically inside the reaction chamber and are preferably generally parallel with the first end 32 and the second end 34. Further, the dividers 24 extend from the first side 36 to the second side 40 of the reaction chamber 12, effectively dividing the reaction chamber 12 into a plurality of subchambers 22. As shown in FIGS. 3 and 4, the notches 26 in the dividers 24 are arranged so as to direct flow of fluid through the reaction chamber 12 in a serpentine manner, from subchamber 22 to subchamber 22. Thus, if one divider 24 has a notch 26 in the lower right-hand corner, the adjacent dividers 24 will have notches in the upper left-hand corner thereof. As an alternative to the notches 26, other means (such as external tubing) could be used to direct liquid flow from subchamber 22 to subchamber 22 in a serpentine manner through the reaction chamber 12. Serpentine flow is preferred as a method for ensuring efficient oxidation of organic compounds in the water.

A plurality of subcovers 42 cover the subchambers 22. As shown in FIGS. 2 and 5, a channel 44 is situated over the reaction chamber 12 running the length of the reaction chamber 12 from the first end 32 to the second end 34 thereof, between the first side 36 and the second side 40. The individual subcovers 42 are attached by means of a subcover hinge 46 or other suitable attachment to the channel 44, and the subcovers 42 extend from the channel 44 over the subchambers 22 to the first side 36 and also to the second side 40. It is preferred that the width of the subcovers 42 correspond to the spacing between the dividers 24, so that each subcover 42 covers the half of the subchamber 22 between the channel 44 and either the first side 36 or the second side 40 of the reaction chamber 12.

Also attached to the channel 44, and extending from the channel 44 in one direction to the first side 36 and in the other direction to the second side 40 of the reaction chamber 12 are, respectively, a pair of main covers 50. The main covers 50 extend over all of the subcovers 42, each main cover 50 covering half of the subcovers 42. Each main cover may be attached to the channel 44 by means of a hinge 51.

Figure 8:
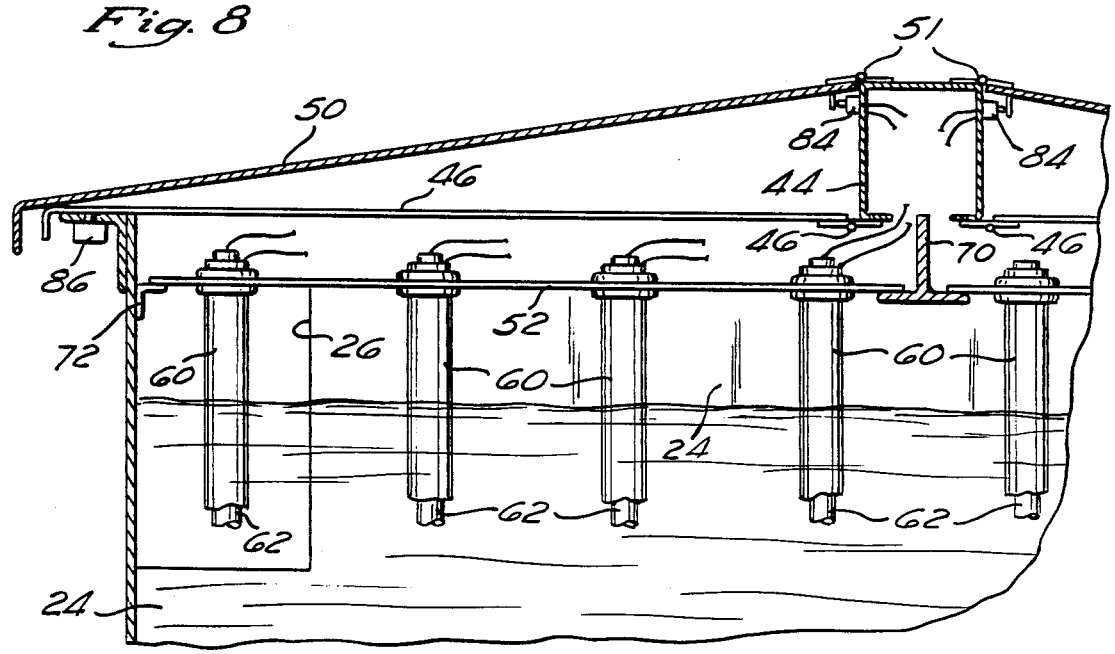
FIG. 8 is a sectional view of the top portion of the reactor taken along the line 8—8 in FIG. 2.

Beneath the covers 50 and the subcovers 42, and over the subchambers 22, are a plurality of lamp holders 52. The respective positions of the subcovers 42, the channel 44, the main covers 50 and the lamp holders 52 is more fully illustrated in FIG. 8.

The lamp holders 52 preferably comprise plates extending from the channel 44 to either the first side 36 or the second side 40 of the reaction chamber 12. These lamp holders 52 each preferably cover one-half of a subchamber 22, as does each subcover 42, and may generally be about the same dimensions as the subcovers 42. Each lamp holder 52 has a plurality of lamp holes 54, as shown in FIG. 6. A grommet 56 of rubber or silicone, or other suitable material may advantageously be provided in each of the lamp holes 54 in the lamp holder 52.

Extending through the grommets 56 in the lamp holes 54 of the lamp holders 52 are UV-transparent tubes 60, into which an ultraviolet lamp 62 is placed. The UV-transparent tubes 60 extend from the lamp holders 52 to the bottom 30 of the reaction chamber 12, and may advantageously be supported and retained by a retainer cup 64 (which may be a section of metal tubing attached to the bottom 30 of the reaction chamber 12) in which resilient tube cushioning material 66 may be provided. The bottom end of each of the tubes 60 should be closed to prevent water from entering the tubes 60, while the top ends may be open to facilitate easy insertion and removal of the lamps 62.

The UV-transparent tubes 60 may be made of any suitable material transparent to the wavelengths being utilized; however, quartz is particularly preferred. The ultraviolet lamps 62 are preferably tubular low pressure mercury vapor lamps, which are similar in appearance to conventional fluorescent lamps, but which lack the phosphor coating of fluorescent lamps. Of course, it is not essential that a single lamp 62 extend all the way from the lamp holder 52 to the bottom 30 of the reaction chamber 12; instead, a plurality of lamps may be utilized if desired. The lamps 62, while preferably elongated low pressure mercury vapor tubes, may instead be arc lamps, medium pressure or high pressure metal vapor lamps, incandescent lamps, or other ultraviolet sources. Moreover, the UV-transparent tubes 60 serve the primary functions of transmitting ultraviolet light and maintaining separation between the liquid being irradiated and the lamp itself. Accordingly, instead of the tubes 60, any other suitable means (such as transparent boxes, plates or windows) may be utilized to prevent water-lamp contact.

The lamp holders 52 are supported at the top of the reaction chamber 12 underneath the subcovers 42 by any suitable means. In the illustrated embodiment (FIG. 8), a "T" or "I" beam 70 supports one end of the lamp holders 52 and brackets 72 attached to the first side 36, and the second side 40 inside the reaction chamber 12 support the other ends of the lamp holders 52. The beam 70 may advantageously extend the length of the channel 44, running directly beneath the channel 44. Of course, any number of alternative means may be employed to support the lamp holders 52 without departing from the spirit of the present invention.

To facilitate insertion of the UV-transparent tubes 60, insertion of the lamps 62 and inspection of the individual subchambers, an inspection hole 74 may also be provided in the lamp holders 52.

Power is supplied to the lamps 62 by means of wiring 76, as illustrated in FIGS. 5 and 7. The wiring 76 preferably extends through the channel 44, which serves to protect and enclose the wiring 76.

The first side 36 of the reaction chamber 12 may advantageously be provided with a plurality of sight glasses 80 to permit visual inspection of the lamps 62 inside each subchamber 22 without opening the main covers 50 or the subcovers 42. Thus, there is preferably at least one sight glass 80 per subchamber 42. The sight glasses 80 preferably include an ultraviolet filter to avoid the possibility of ocular damage while inspecting the subchambers 22 through the sight glasses 80.

Process monitors 82 may be provided in the reactor 10 of the present invention to monitor conditions in the reaction chamber 12, and may also be provided in the inlet 16 or outlet 20 to monitor conditions of the water entering or leaving the reactor. These process monitors may include temperature monitors, monitors to determine the concentration of oxidizing agent at one or more locations, monitors to detect the impurity level in the water being treated, and so forth. The signal from these monitors may be used, e.g., to adjust the flow rate of water through the reaction chamber 12 (and thus, the residence time in the reaction 10) or to adjust the amount of oxidizing agent added to the incoming water.

At least two main cover sensors 84 are provided to sense whether the main covers 50 are open or closed. In addition, at least one subcover sensor 86 is provided for each subcover to sense whether each subcover is open or closed. The sensors 84, 86 are preferably switches that are actuated by a change in the position of the cover. Normally open or normally closed contact switches are particularly suitable.

The main cover sensors 84 actuate a cover alarm 90 if unauthorized opening of the main covers 84 occurs. The subcover sensors 86 are each connected to a lamp relay 92 to interrupt power to the lamps 62 in the subchamber 22 when a subcover 42 over that subchamber 22 is opened, thus greatly reducing the risk of inadvertent ultraviolet exposure to maintenance personnel and others who might open the subcover 42.

Figure 9:
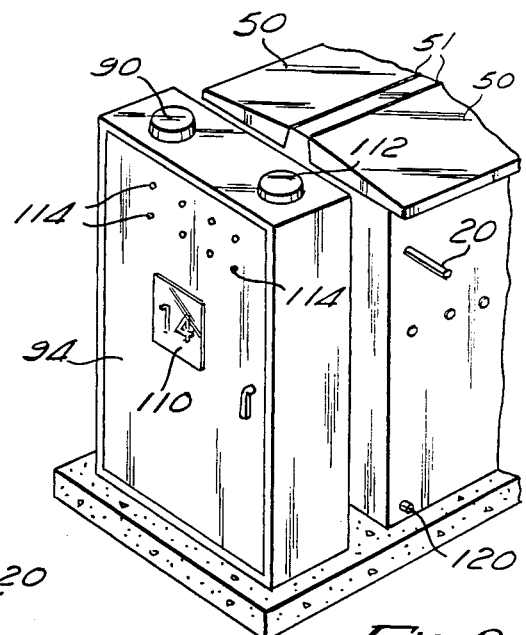
FIG. 9 is a perspective view of the exterior of the control housing from the direction of the line 9—9 in FIG. 1.

The control housing 14 may be any suitable type of enclosure for the electronics and control circuitry utilized for the reactor. In the illustrated embodiment (see FIGS. 9 and 10), the control housing is a rectangular box having a door 94 which can be opened to reveal the circuitry and the components contained in the control housing 14.

Figure 10:
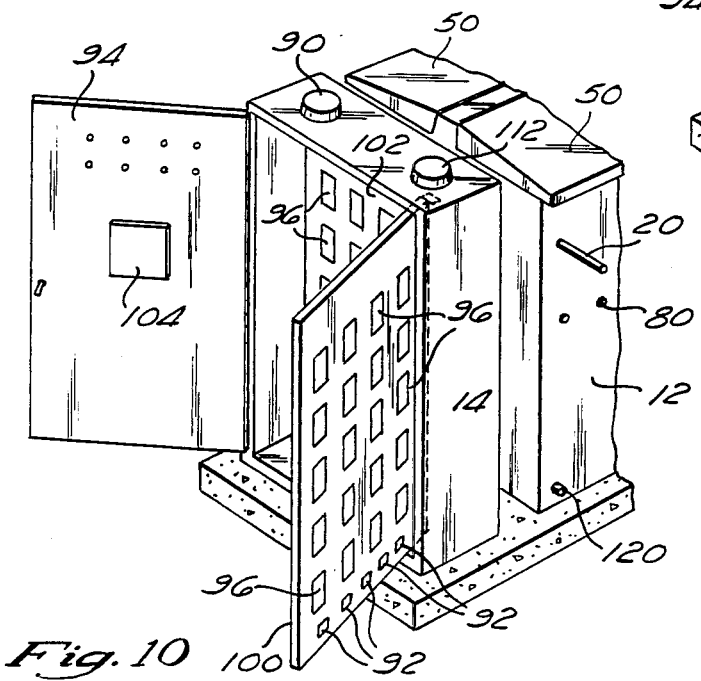
FIG. 10 is a perspective view of the interior of the control housing.

When the lamps 62 in the reaction chamber 12 are low pressure mercury vapor lamps, the control housing 14 may advantageously contain ballasts 96 for those lamps. Typically, one ballast will drive two lamps. The ballasts 96 and the lamp relays 92, together with circuit blocks and other electrical or electronic components, may advantageously be mounted on the panels 100, 102. As shown in FIG. 10, where more than one panel is provided, one of the panels 100 may be made movable to permit access to the other panel 102, as by hinging one of the panels 100 to swing out and reveal the other panel 102.

The reactor 10 is also provided with lamp and process monitoring circuitry 104, which is preferably primarily located in the control housing 14. The monitoring circuitry 104 includes means for determining the operating condition of the lamps 62. Any suitable means for determining the operating condition of the lamps 62 may be used.

One suitable technique is to monitor the current drawn by each ballast 96. If ballast current is low, this may indicate that only one of the two lamps 62 driven by the ballast is operating. If ballast current is normal, both the ballast 96 and the two lamps 62 are operating. If ballast current is high or is zero, both lamps 62 may be inoperative or a defect in the ballast 96 may have occurred.

Alternatively, the operating condition of the lamps 62 may be directly monitored through use of a photodetector 106 (see FIG. 7) which may be placed adjacent to or on the lamp 62, and is preferably mounted on the tube 60. The photodetector 106 may comprise a photoelectric cell, a photoresistor or any other suitable ultraviolet radiation detector. As still another alternative, a heat detector may be used to monitor the heat generated by the operation of the lamp 62. Other methods for monitoring the operation of the lamps 62 will be apparent to those skilled in the art and, thus, are considered to be within the scope of the present invention.

The monitoring circuitry 104 may be directly and continuously connected to the photodetectors 106 or other means utilized to detect the operating condition of the lamps 62. Alternatively, the monitoring circuitry 104 may scan the photodetectors 106, the ballasts 96 or the other means utilized to determine the operating condition of the lamps 62. Sequentially and repetitively scanning the operating condition of each lamp 62 is preferred. The monitoring circuitry 104 also includes a counter for determining how many lamps 62 at any one time are inoperative, and is connected to a visual display 110 (see FIG. 9) for indicating which lamps 62 are or are not operative. In a preferred embodiment of the invention, the monitoring circuitry 104 sequentially interrogates each of the ballasts 96 (e.g., by measuring the voltage across a resistor wired in series with the ballast) or each of the photodetectors 106 or other means for detecting the operating condition of the lamps. If a lamp or ballast is not operating normally, the display 110 displays the number of that lamp. A counter is provided which counts the number of lamps 62 or ballasts 96 which are inoperative each time the monitoring circuitry 104 completes a cycle of interrogating each of the ballasts 96, photodetectors 106 or other detection means. When the number of inoperative or improperly functioning ballasts 96 or lamps 62 exceeds a predetermined number, the monitoring circuitry 104 triggers a process alarm 112 to indicate that maintenance is needed.

In addition to the alarms 90, 112 and the display 110, the control housing 14 may also be provided with indicator lamps 114 to indicate the occurrence of high or low water level in the reaction chamber, cessation of influent flow, outer cover open, whether any lamps are out, whether more than a predetermined number of lamps are out, whether the system is in operation, whether oxidizer level is satisfactory, and so forth. The various indicators lamps 114 may be actuated by the process monitors 82, the main cover sensor 84, the subcover sensors 86 and by the monitoring circuitry 104.

Other features that may be provided on the reaction chamber 12 include an overflow port 116, which is preferably located slightly higher than the outlet 20. The overflow port 116 prevents flooding of the reaction chamber 12 and possible damage to the lamps 62 and the wiring 76 if, for any reason, water is entering the reaction chamber 12 through the inlet 16 but is not being removed from the reaction chamber 12 at the same rate through the outlet 20. In addition, one or more cleanout plugs 120 may be provided near the bottom 30 of the reaction chamber 12, preferably in the sides 36, 40 of the reaction chamber 12, to facilitate cleaning precipitates and residues out of the reaction chamber 12. If desired, one clean-out plug 120 may be provided for each subchamber 22.

In use, water to be treated is introduced into the inlet 16 at a constant rate. The water flows from subchamber 22 to subchamber 22 through the notches 26 and the dividers 24, in a serpentine manner. The flow of the water takes it past all of the lamps 62, which irradiate the water. An oxidizing agent, such as hydrogen peroxide or ozone, is mixed with the incoming aqueous stream in a conventional manner (such as by means of a metering pump or other suitable device) prior to introduction of the water into the inlet 16. Alternatively, mixing of the oxidizing agent and the water may be effected in the reaction chamber 12. As the mixture of oxidizing agent, water and organic impurities is irradiated, the oxidation of the organic compounds to carbon dioxide and water occurs in a well-known manner. After passing through the final subchamber, the treated effluent is discharged through the outlet 20.

In a 900-gallon tank, for example, with 80 low pressure 5-foot 60 watt ultraviolet lamps, a flow rate of 30 gallons per minute will provide a 30-minute residence time in the reactor. If 40-100 ppm hydrogen peroxide is mixed with the incoming water in the inlet, organic residues in the amount of 1-25 ppm can generally be oxidized down to concentrations of parts per billion, even when only 60% of the lamps in the reactor are operational. These figures, of course, will vary from application to application and are dependent upon a number of interrelated factors, including lamp output, lamp wavelength, the type of residues being oxidized, water temperature, and so forth.

As the water flows through the reaction chamber 12 and is treated, the control circuitry 104 continually monitors the operating condition of the lamps. As lamps burn out and otherwise cease to function, the digital display 110 displays the identification of the non-functioning lamps and indicates the number of lamps which are non-functional. A counter in the monitoring circuitry 104 keeps track of the number of ballasts or lamps which are not functioning normally. When the count reaches a predetermined number (such as six non-functioning ballasts or 12 non-functioning lamps in a 40-ballast, 80-lamp system), the process alarm 112 is actuated to generate an audible signal, notifying maintenance personnel that further reductions in the number of operational lamps may compromise the ability of the reactor 10 to remove impurities in the water.

When maintenance to the lamps is necessary, the maintenance worker disables the cover alarm 90 and determines (either by means of the display 110 or by viewing the lamps through the sight glasses 80) which lamps need attention. One of the main covers 50 is then opened, and the maintenance worker opens a subcover 42 over one of the nonfunctioning lamps 62. When the subcover 42 is opened, the subcover sensor 86 opens the lamp relay 92 controlling power to the lamps in the subchamber 22 over which the subcover 42 is located. Meanwhile, power continues to be supplied to the lamps in the other subchambers 22 (which are not covered by the open subcover 42), so the reactor 10 remains on-line during the maintenance procedure. The maintenance worker removes the nonfunctioning lamp 62 by pulling it out of the tube 60, and then replaces the nonfunctioning lamp 62 with a new lamp 62. Because the lamps in the subchamber 22 in question are extinguished during this procedure, and because each subchamber 22 is separated from the other subchambers 22 by the dividers 24 and is covered by the lamp holders 52 and the subcovers 42, the maintenance worker is not exposed to a dangerous degree of ultraviolet light. (Of course, as a precaution, the maintenance worker may wish to wear protective eyewear and clothing.)

After servicing the lamps 62 (and, if appropriate, the tubes 60 and the wiring 76) under the opened subcover 22, the maintenance worker closes that subcover and opens another subcover 42 over other lamps that need to be serviced. This procedure is repeated until all of the lamps requiring maintenance work have been serviced, and, as explained, during the servicing procedure the reactor 10 remains on-line and the quality of the oxidation occurring in the reaction chamber 12 is not compromised. Upon completion of the maintenance procedures, the main cover 50 is closed and the cover alarm 90 is reactivated.

In the event that unauthorized persons attempt to gain access to the reaction chamber 12 by opening one of the main covers 50, the cover alarm 90 is actuated. If the unauthorized person then opens a subcover 42 before security personnel arrive, accidental exposure to ultraviolet light is avoided because the lamps underneath the subcover 42 are extinguished when the subcover 42 is opened.

Figure 11:
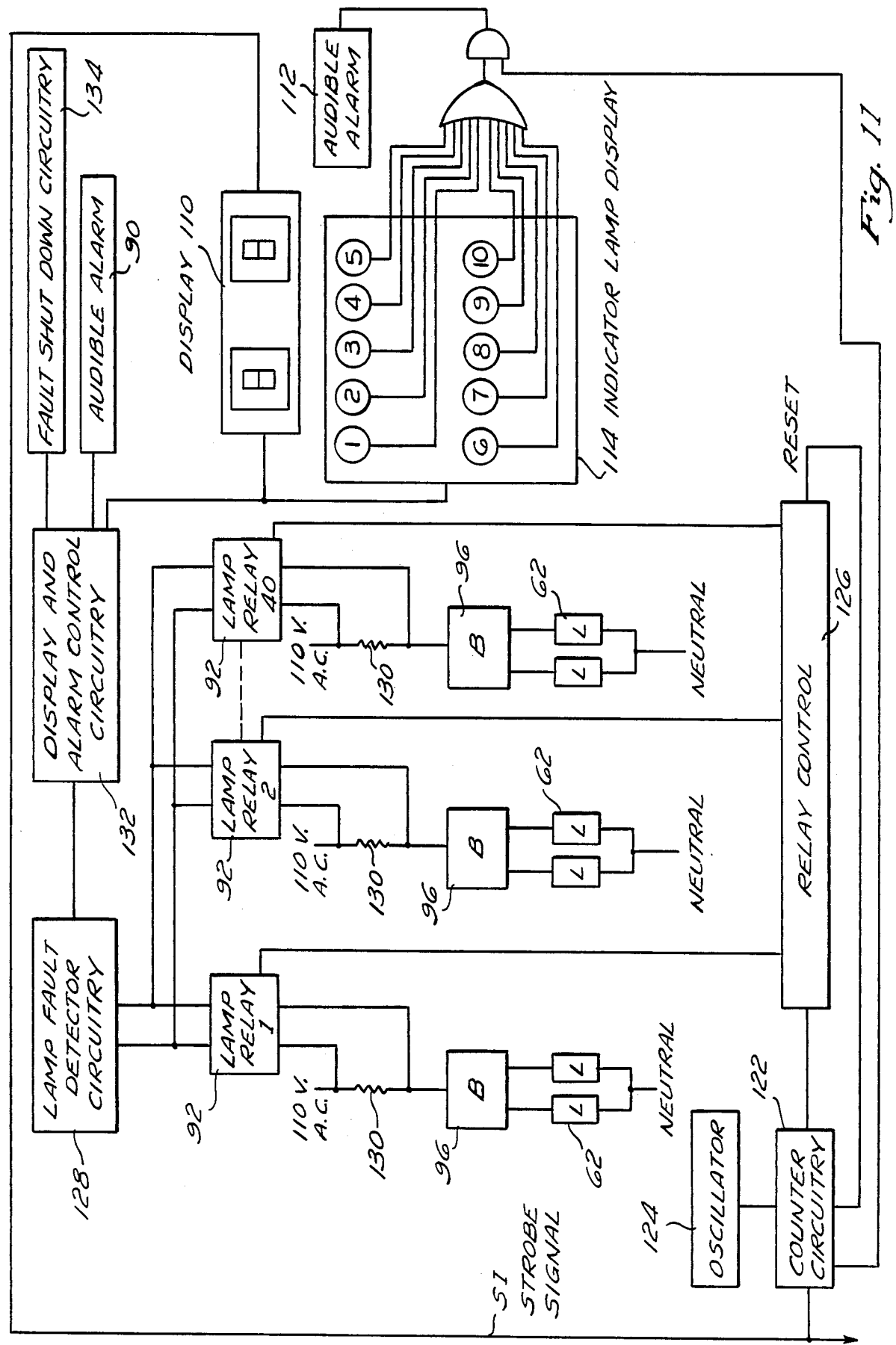
FIG. 11 is a schematic diagram of the lamp and process monitoring circuitry.
Figure 12:
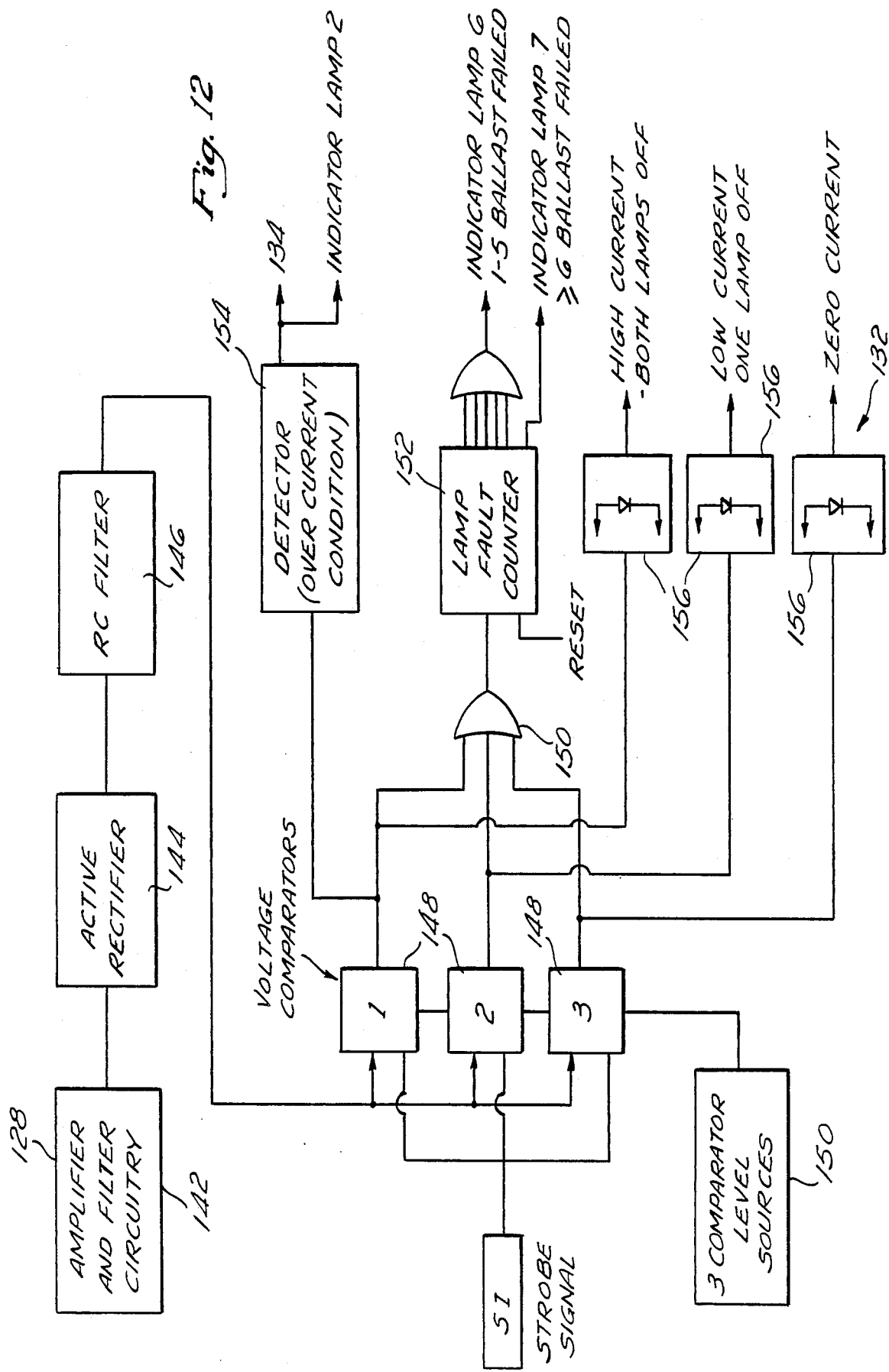
FIG. 12 is a schematic diagram of the fault detector, alarm, and display circuitry.

One preferred embodiment of the lamp and process monitoring circuitry 104 for implementing the monitoring and control functions is illustrated in FIGS. 11 and 12. FIG. 11 illustrates the lamp and process monitoring circuitry 104. The lamp and process monitoring circuitry 104 includes counter circuitry 122, driven by an oscillator 124. The counter circuitry 122 repetitively scans the operating condition of the lamps 62 and the corresponding ballasts 96 in a sequential manner enabled by the relay control 126, which activates each of the 40 lamp relays 92 for a short period of time.

The lamp and process monitoring circuitry 104 further includes lamp fault detector circuitry 128. The fault detector circuitry 128, consistent with a preferred embodiment of the invention, interrogates each of the ballasts 96, preferably by measuring the voltage drop across each of 40 current sensing resistors 130 (the voltage drop across the resistor is proportional to the current flow through the resistor by Ohm's law), wired in series with the ballasts 96. The voltage drop across each of the current sensing resistors 130 is monitored during the short period of time during which each of the lamp relays 92 is activated.

The lamp and process monitoring circuit further includes display and alarm control circuitry 132, connected to the lamp fault detector circuitry 128. The fault detector circuitry 128 relays signals indicative of the condition of the lamps to the display and alarm control circuitry 132. The display and alarm control circuitry is connected to fault shutdown circuitry 134 which effectively shuts off power to the lamps 62 when a critical failure is detected. The display and alarm control circuitry 132 is also connected to two audible alarms 90 and 112. The audible alarm 90 sounds when the main covers 50 are opened. Likewise, the audible alarm 112 sounds for a predetermined time period, advantageously about 2 seconds, at the end of each scan cycle if there are any fault conditions indicated.

In addition, the display and alarm control circuitry 132 is also connected to the indicator lamps 114. The indicator lamps 114 display the type of failure that has occurred thereby providing a visual indication of the operating condition of the lamps 62. The indicator lamps 114 display the following conditions: "low flow", "shutdown", "tank level low", "tank level high", "1–5 ballasts failed", "6 or more ballasts failed", "$H_2O_2$ low", "$H_2O_2$ high", and "outer cover." An indication of a failure or other condition from any one of the indicator lamps 114, together with a signal from the counter circuitry 122 indicating the end of a scan cycle activates the intermittent audible alarm 112.

The lamp and process monitoring circuitry 104 as indicated in FIG. 11 also includes the display 110 which consists of two seven segment display LEDS whereby each failed ballast number is displayed. The display 110 is connected to the display and alarm control circuitry 132. The display 110 is activated by a strobe signal SI from the counter circuitry 122.

FIG. 12 illustrates details of the fault detector circuitry 128 and the display and alarm control circuitry 132. The fault detector circuitry 128 includes amplifier and filter circuitry 142, which in a manner well known in the art, amplifies and filters the voltage. In addition, the fault detector circuitry 128 includes an active rectifier 144 and a RC filter 146, which rectifies the voltage and subsequently filters it.

The lamp fault detector circuitry 128 further includes three voltage comparators 148 and three comparator level sources 150, wherein each of the voltage comparators 148 is enabled at the proper time in the measurement cycle by the strobe signal SI from the counter circuitry 122. Typically, the voltage comparators 148 determine the current value (proportional to the voltage) which is indicative of one of the four conditions mentioned below:

Ballast Current is ZERO
Ballast Current is LOW—One lamp operating
Ballast Current is NORMAL—Ballast and two lamps operating
Ballast Current is HIGH—Both lamps not operating or system fault occurred.

In the preferred embodiment the current range is advantageously approximated to be about 0.1 Amps for the ZERO current condition, between 1.2–1.35 Amps for the LOW current condition, between 1.4–1.7 Amps for the NORMAL current condition, and about 2.0 Amps for the HIGH current condition.

The display and alarm control circuitry 132 includes an OR gate 150 connected to a lamp fault counter 152. The OR gate 150 provides the summation of the comparator outputs from the three comparator voltages and the lamp fault counter 152 keeps track of the number of failures that occur in one scan cycle. The fault counter 152 has five outputs leading into a second OR gate 153. The second OR gate 153 is connected to indicator lamp number six of the indicator lamps 114 which displays "1–5 ballasts failed." The sixth output of lamp fault counter 152 is connected directly to indicator lamp number 7 of the indicator lamps 114 which displays "6 or more ballasts failed."

Furthermore, the display and alarm control circuitry includes a detector 154 connected to the first of the three voltage comparators 148 which determines an overcurrent condition. The detector 154 may preferably be a D flip-flop. The outputs from the detector 154 are connected to fault shutdown circuitry 134 and indicator lamp number 2 of the indicator lamps 114 (shown in FIG. 11). The outputs of the three voltage comparators 148 are also directly connected to three LED displays 156, each of which lights up to indicate one of the three above-mentioned conditions other than NORMAL, for each ballast.

In operation, the counter circuitry 122 and relay control 126 sequentially activate each of 40 lamp relays 92, enabling the fault detector circuitry 128 to sequentially measure the voltage drop across each of 40 current sensing resistors 130. For example, if an over current condition (i.e. HIGH current) is detected at the second current sensing resistor during the scan cycle indicating that both lamps 62 are not operating or that a system fault has occurred, the corresponding ballast number would be momentarily displayed at the seven segment LED display 110. In this particular case, lamp number 2 of the indicator lamps 114 displaying "shutdown" would light up, and the power to all ballasts would be turned off. Also, the LED of the three LED displays 156 corresponding to HIGH current would light up at the same time that the seven segment display 110 is indicating that the system is monitoring ballast number 2 of the ballasts 96. Further, indicator lamp number 6 of the indicator lamps 114 would light up displaying "1–5 ballast failed". Indicator lamp number 6 of the indicator lamps 114 would continue to display the above-stated condition as the operating conditions of the lamps 62 are scanned. At the end of the scan cycle, if the total number of failed ballasts are six or greater, indicator lamp number 7 of the indicator lamps 114, displaying "6 or more ballasts failed" would light up. Also, at the end of each scan cycle, the audible alarm 112 would sound, thereby indicating to the system operator on his next round that a failure had been detected.

Although this invention has been described in the context of certain preferred embodiments, it is intended that the scope of the invention covered by this patent not be limited to the specific embodiments disclosed, but instead should be determined by reference to the following claims.

What is claimed is:

1. A method for photolytic oxidation of organic residues in an aqueous stream, comprising the steps of:
    introducing said aqueous stream into a chamber through an inlet, wherein said chamber is divided into a plurality of subchambers;
    providing at least one ultraviolet lamp in each of said subchambers;
    directing said liquid stream through said chamber from subchamber to subchamber;
    introducing an oxidizing agent into said aqueous stream;
    irradiating said aqueous stream containing said oxidizing agent in said subchambers by means of said lamps;
    providing at least one separately-openable cover over each subchamber;
    separately monitoring the operating condition of the lamps in each subchamber; and
    disabling the lamps in one of said subchambers and servicing said lamps while the lamps in other of said subchambers are enabled and said aqueous stream continues to pass through said chamber, and oxidizing substantially all inorganic impurities in said stream in said other subchambers while servicing said disabled lamps.

2. The method of claim 1, wherein the number of lamps provided in said chamber are in excess of the number required to catalyze the oxidation of the organic impurities in said liquid stream, so that substantially complete oxidation of said impurities occurs even though the lamps in one of said subchambers are disabled.

3. The method of claim 2, wherein each of said subchambers further includes means for disabling all of the lamps in said subchamber when a subcover over said subchamber is opened.

4. The method of claim 2, further comprising the steps of:
    providing a cover over a plurality of said subcovers; and
    providing an alarm actuated by the opening of said cover.

5. The method of claim 1, further comprising the steps of:
    monitoring the operation of each of said lamps; and
    providing an indication of the operating condition of each of said lamps.

6. The method of claim 5, wherein said lamps are mercury vapor lamps, and power to said lamps is provided through a plurality of ballasts, wherein the monitoring step comprises monitoring the operation of each of said ballasts.

7. The method of claim 5, further comprising the step of counting the number of lamps which are not functioning and providing a visual display of said number.

8. The method of claim 7, further comprising the step of sounding an alarm when the number of lamps which are not functioning exceeds a predetermined number.

9. The method of claim 8, wherein said alarm is an audible alarm.

* * * * *